US011281193B2

(12) United States Patent
Ishino

(10) Patent No.: US 11,281,193 B2
(45) Date of Patent: Mar. 22, 2022

(54) WORK SYSTEM AND PROGRAM THEREOF

(71) Applicant: Hitachi Industry & Control Solutions, Ltd., Hitachi (JP)

(72) Inventor: Tomoko Ishino, Hitachi (JP)

(73) Assignee: HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 27 days.

(21) Appl. No.: 16/898,509

(22) Filed: Jun. 11, 2020

(65) Prior Publication Data
US 2020/0393821 A1 Dec. 17, 2020

(30) Foreign Application Priority Data
Jun. 11, 2019 (JP) .............................. JP2019-108980

(51) Int. Cl.
G05B 19/418 (2006.01)
G06F 16/901 (2019.01)
G06F 8/38 (2018.01)

(52) U.S. Cl.
CPC ... *G05B 19/41865* (2013.01); *G05B 19/4183* (2013.01); *G05B 19/41835* (2013.01); *G06F 8/38* (2013.01); *G06F 16/901* (2019.01)

(58) Field of Classification Search
CPC .......... G05B 19/41865; G05B 19/4183; G05B 19/41835; G05B 2219/31395; G05B 2219/31376; G06F 16/901; G06F 8/38; Y02P 90/02
See application file for complete search history.

(56) References Cited

U.S. PATENT DOCUMENTS

| | | | | |
|---|---|---|---|---|
| 5,006,992 A | * | 4/1991 | Skeirik | G05B 13/028 706/58 |
| 2004/0085561 A1 | * | 5/2004 | Fromherz | G06Q 10/06 358/1.13 |
| 2004/0109188 A1 | | 6/2004 | Akiyoshi et al. | |

(Continued)

FOREIGN PATENT DOCUMENTS

| | | |
|---|---|---|
| GB | 2 513 958 A | 11/2014 |
| JP | 2001-249873 A | 9/2001 |

(Continued)

OTHER PUBLICATIONS

Japanese Office Action of JP2019-108980 dated Feb. 2, 2018.

(Continued)

*Primary Examiner* — Christopher E. Everett
(74) *Attorney, Agent, or Firm* — Mattingly & Malur, PC

(57) ABSTRACT

This invention implements a work system high in flexibility and speedy system development. The work system includes a plurality of modules each having software for work which performs predetermined in-module processing, and a service base unit which inputs and outputs event information to and from the modules. The event information includes an identifier and a payload. The service base unit has a function of receiving the event information from any of the modules, and a function of transferring the event information to the other module. The other module to which the event information is transferred determines based on the identifier included in the transferred event information whether the in-module processing is performed within its own module.

9 Claims, 6 Drawing Sheets

(56) References Cited

U.S. PATENT DOCUMENTS

| | | |
|---|---|---|
| 2006/0224766 A1 | 10/2006 | Malackowski et al. |
| 2008/0031139 A1 | 2/2008 | Muro et al. |
| 2013/0233922 A1* | 9/2013 | Schoening ......... G06Q 10/0875 |
| | | 235/385 |
| 2013/0247117 A1 | 9/2013 | Yamada et al. |
| 2013/0278966 A1 | 10/2013 | Saito et al. |
| 2014/0304706 A1 | 10/2014 | Zhang et al. |
| 2018/0349084 A1 | 12/2018 | Nagasaka et al. |
| 2019/0074868 A1 | 3/2019 | Calabrese |

FOREIGN PATENT DOCUMENTS

| | | |
|---|---|---|
| JP | 2004-127280 A | 4/2004 |
| JP | 2008-042458 A | 2/2008 |
| JP | 2008-534173 A | 8/2008 |
| JP | 2010-171557 A | 8/2010 |
| JP | 2012-003473 A | 1/2012 |
| JP | 2013-225738 A | 10/2013 |
| JP | 2016-502186 A | 1/2016 |
| JP | 2018-160824 A | 10/2018 |
| WO | 2012/070250 A | 5/2012 |
| WO | 2013/134409 A1 | 9/2013 |
| WO | 2017/141502 A | 8/2017 |

OTHER PUBLICATIONS

Extended European Search Report received in corresponding European Application No. 20179412.0 dated Oct. 16, 2020.
Japanese Office Action received in corresponding Japanese Application No. 2019-108980 dated Jun. 23, 2020.

* cited by examiner

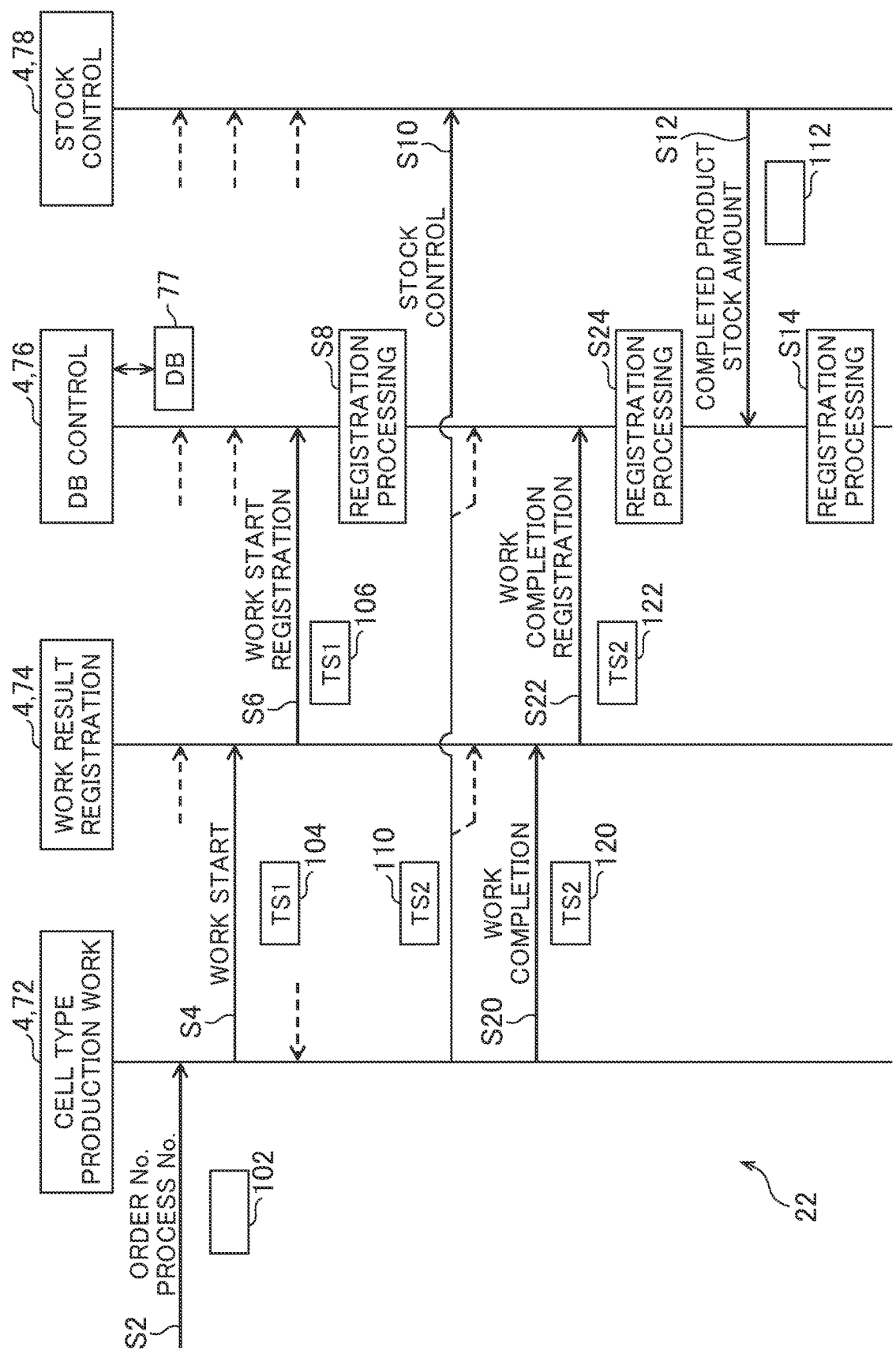

WORK SYSTEM AND PROGRAM THEREOF

CROSS-REFERENCE TO RELATED APPLICATION

The present application claims priority from Japanese application JP2019-108980 filed on Jun. 11, 2019, the contents of which is hereby incorporated by reference into this application.

BACKGROUND

The present invention relates to a work system and a program thereof.

As a background technology in this technical field, there has been described in an abstract of Patent Document 1: Japanese Unexamined Patent Application Publication No. 2012-003473 that "a program development support device 10 constructing a program by combining a plurality of functional blocks includes a functional block database 1 which manages the functional blocks and basis information related to a definition basis for the functional blocks, an interface generating means 3 which generates an interface to define a flow of the program by combining the held functional blocks, an insertion spot extracting means 4 which extracts an insertion spot of each functional block on the basis of a variable dependent relation between the functional blocks incorporated in the flow under definition, a candidate block row generating means 5 which generates a candidate block row to be inserted into the extracted insertion spot, and a validity determining means 6 which determines validity of the generated candidate block row on the basis of the basis information and a predetermined criterion."

SUMMARY

Incidentally, in an assembly and processing manufacturing industry, IoT conversion in a manufacturing industry has been progressing rapidly. For example, commercial material development of creating a standard package commercial material in which requirements for the least common multiple of wide variety of customer requirements are taken as standard specifications, and thereafter applying it to customer requirements by customization has been progressing. In this type of commercial material, the development of commercial materials in a limited specialized range has been progressing due to a difficulty in standardization. However, especially in the field of the assembly and processing manufacturing industry, manufacturing/management forms corresponding to a wide variety of commodity characteristics exist, and a production line is also constituted of both resources of persons and facilities. There has therefore been a demand to specialize a package commercial material to be introduced, for each customer, and add-ons and customization become large upon its application. Further, as market competitiveness intensifies, a factory operation way requested to companies changes in a short period of time and is shifting to a reform from individual optimum to overall optimum. There has been a demand for strengthening of governance at all bases by the headquarter function or a mother plant. The form of IT required is also required to have flexibility such as "flexible and variable correspondence to the scope of work is easily possible", "a reform following a change in factory operation way is easily possible", and "development of other bases is easily possible", and speediness of system development.

The present invention has been made in view of the above circumstances. An object of the present invention is to provide a work system high in flexibility and easy in expansion, and a program thereof.

In order to solve the above problems, a work system of the present invention includes a plurality of modules each having software for work which performs predetermined in-module processing, and a service base unit which inputs and outputs event information to and from the modules. The event information includes an identifier and a payload. The service base unit has a function of receiving the event information from any of the modules, and a function of transferring the event information to the other module. The other module to which the event information is transferred determines based on the identifier included in the transferred event information whether the in-module processing is performed within its own module.

According to the present invention, it is possible to provide a work system high in flexibility and easy in expansion, and a program thereof.

BRIEF DESCRIPTION OF THE DRAWINGS

FIG. 9 is a diagram showing an example of a control sequence in a work control device.

DETAILED DESCRIPTION

Overall Configuration of Embodiment

Figure 1:
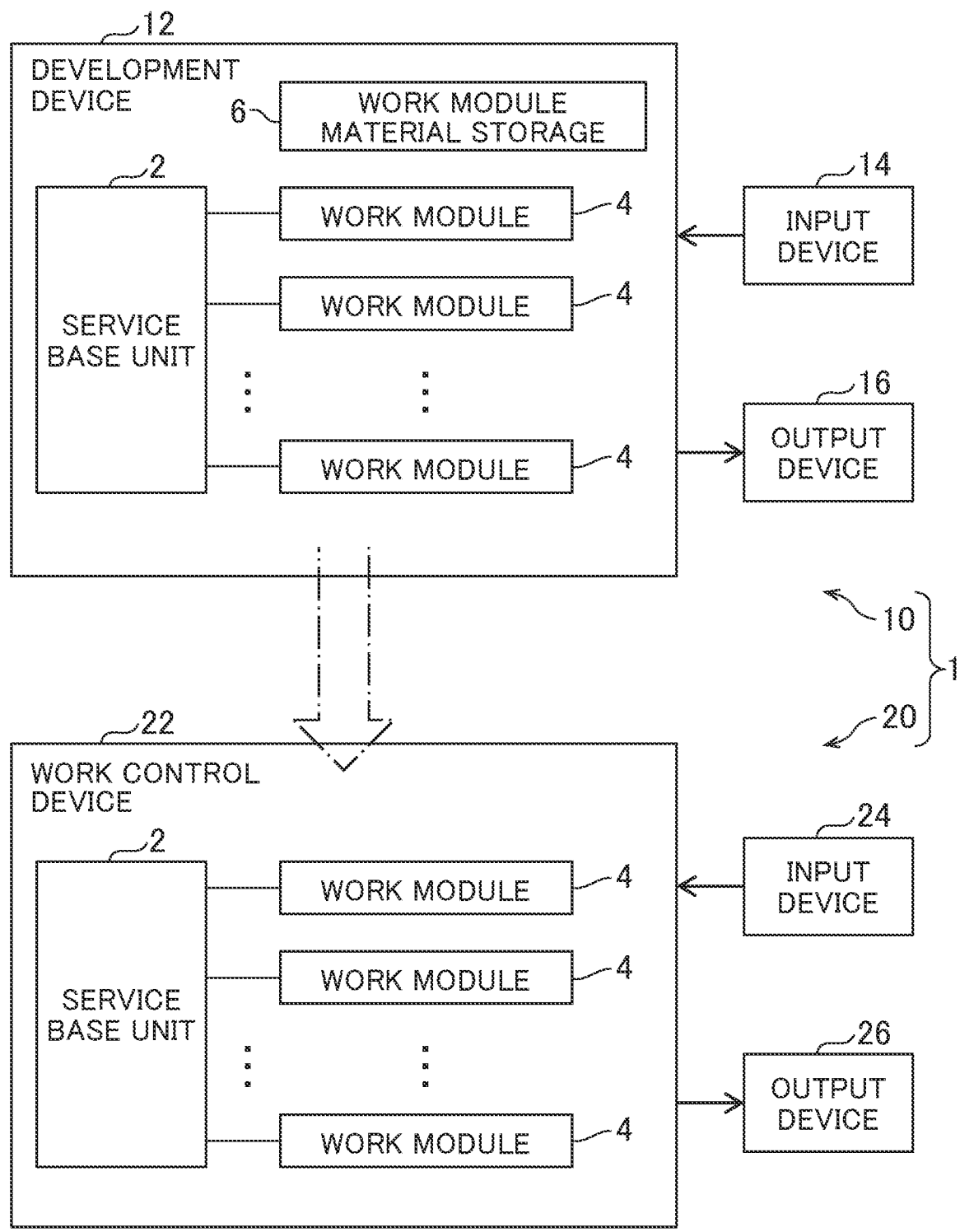
FIG. 1 is a block diagram of a work system according to one embodiment of the present invention.

FIG. 1 is a block diagram of a work system 1 according to one embodiment of the present invention.

In FIG. 1, the work system 1 includes a development system 10 and a work control system 20. The work control system 20 is a system which performs a production plan, parts supply, assembly, inspection, maintenance, etc. in a factor or the like, for example. Further, the development system 10 is a system which develops software applied to the work control system 20.

The development system 10 includes a development device 12 (computer), an input device 14, and an output device 16. The input device 14 inputs various information to the development device 12, and the output device 16 outputs the various information supplied from the development device 12. Further, the work control system 20 includes a work control device 22 (computer), an input device 24, and an output device 26. The input device 24 inputs various information to the work control device 22, and the output device 26 outputs the various information supplied from the work control device 22. Incidentally, the output devices 16 and 26 respectively include a display, for example.

The development device 12 and the work control device 22 both include hardware as general computers, such as a CPU (Central Processing Unit), a RAM (Random Access Memory), a ROM (Read Only Memory), an SSD (Solid State Drive), etc. An OS (Operating System), an application program, various data, etc. are stored in the SSD. The OS and the application program are developed in the RAM and executed by the CPU.

Further, the development device 12 and the work control device 22 may respectively be one in which a plurality of computers are connected by a network. In FIG. 1, functions to be realized by an application program or the like are shown as blocks inside the development device 12 and the work control device 22.

That is, the development device 12 includes a service base unit 2, a plurality of work modules 4 (modules), and a work module material storage 6 (module material storage). Further, the work control device 22 includes a service base unit 2 and a plurality of work modules 4. When the service base unit 2 and the work modules 4 in the work control device 22 are developed by the development device 12, and a user performs a predetermined operation, they are transferred from the development device 12 to the work control device 22. When this transfer processing is performed, the service base unit 2 and the work modules 4 become the same one in the development device 12 and the work control device 22. Incidentally, the work module material storage 6 is not transferred to the work control device 22.

Each work module 4 is an element of an autonomous distribution system and includes software which performs predetermined work processing. Further, each work module 4 is a compilation of functions to be performed by the work control device 22 for each work unit and is attachable/detachable to/from the service base unit 2. Here, the term "work" includes, for example, a "production planning work" which creates a production plan, a "parts supply work" which performs parts supply such as ordering of parts, stock control, etc., an "assembly work" which assembles a product or a semi-manufactured product by using the supplied parts, an "inspection work" which performs inspection of each product, etc., a "maintenance work" which performs maintenance of each product or the like, etc. Further, the service base unit 2 mediates exchange of information or the like between the respective work modules 4.

The work module material storage 6 stores therein a plurality of work module materials 7 (module materials: refer to FIG. 5) which can be candidates of the work modules 4. When the user performs a predetermined operation in the development device 12, the work module material 7 is read from the work module material storage 6 and taken as the work module 4, and is then connected to the service base unit 2.

<Outline of Work Module 4>

In a factory (not shown) to which the work device control 22 is applied, a line production system, i.e., a production system of mass-manufacturing a single product is assumed to have been adopted. Then, even in terms of the work module 4 in the work control device 22, there is adopted one suitable for the line production system.

Figure 2:
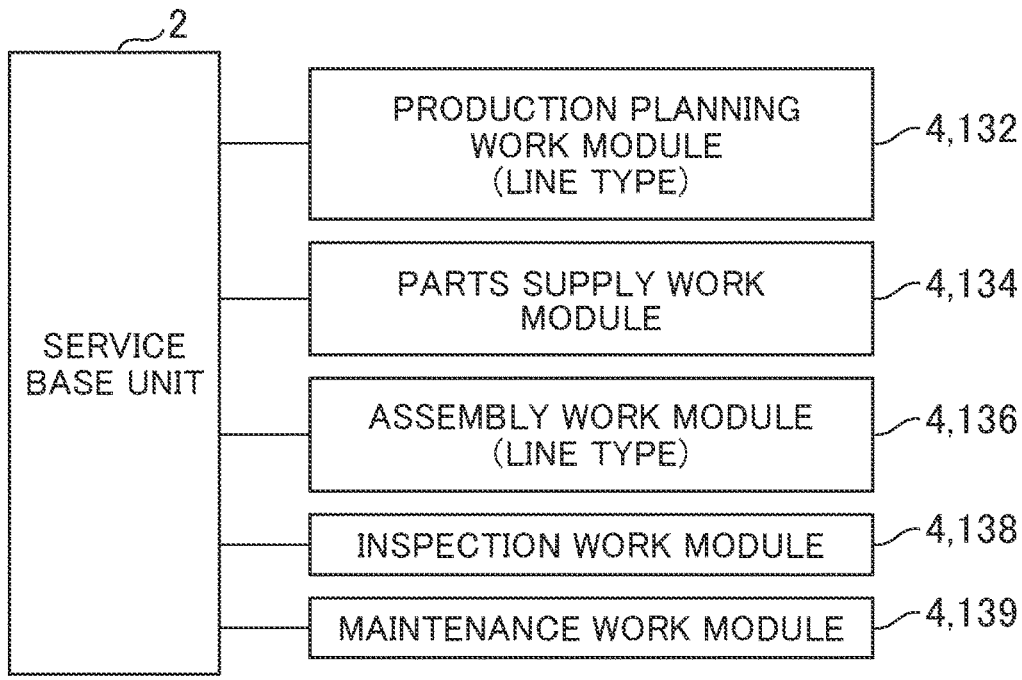
FIG. 2 is a diagram showing an example of a work module configuration suitable for a line production system.

FIG. 2 is a diagram showing an example of a work module configuration suitable for the line production system. In the example of FIG. 2, the work modules 4 connected to the service base unit 2 include a production planning work module 132 of a line type, a parts supply work module 134, an assembly work module 136 of a line type, an inspection work module 138, and a maintenance work module 139.

However, assume that there occurs a request to change a production system of a factory to a cell production system suitable for multi-product small volume production due to reasons such as dealing with diversification of consumer's needs, etc. Then, the configuration of each work module 4 described above may be changed as shown in FIG. 3.

Figure 3:
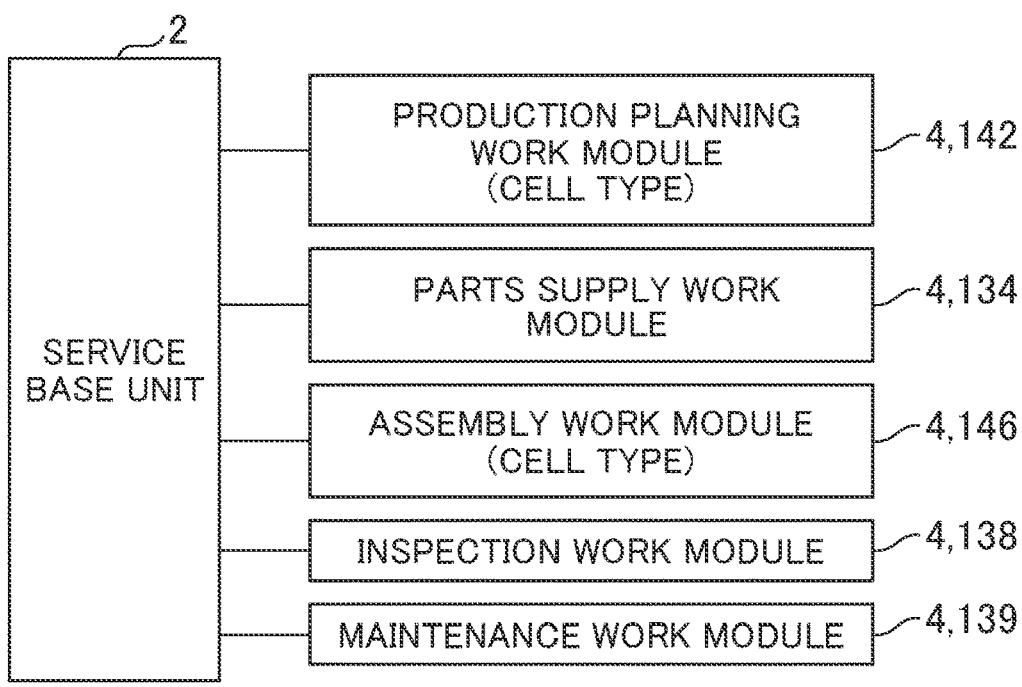
FIG. 3 is a diagram showing an example of a work module configuration suitable for a cell production system.

FIG. 3 is a diagram showing an example of a work module configuration suitable for the cell production system. In FIG. 3, a parts supply work module 134, an inspection work module 138, and a maintenance work module 139 are connected to a service base unit 2 in a manner similar to FIG. 2. On the other hand, in FIG. 3, a production planning work module 142 of a cell type and an assembly work module 146 are connected to the service base unit 2 instead of the line type production planning work module 132 and the assembly work module 136 in FIG. 2.

Thus, as the work modules 4 other than the production planning work module 142 and the assembly work module 146, the previous ones can be applied as they are. More specifically, in the development device 12, a user being a developer eliminates the line type production planning work module 132 and the assembly work module 136 (refer to FIG. 2) out of the work modules 4. Next, the user reads the cell type production planning work module 142 and assembly work module 146 from the module material storage 6 and connects them to the service base unit 2. Then, the user performs a test on the service base unit 2 and each work module 4. When the test is completed, the user transfers the service base unit 2 and the work module 4 from the development device 12 to the work control device 22.

Now, further assume that there occurs a request to perform the control of transportation work. Then, the above-described configuration of each work module 4 may be changed as shown in FIG. 4.

Figure 4:
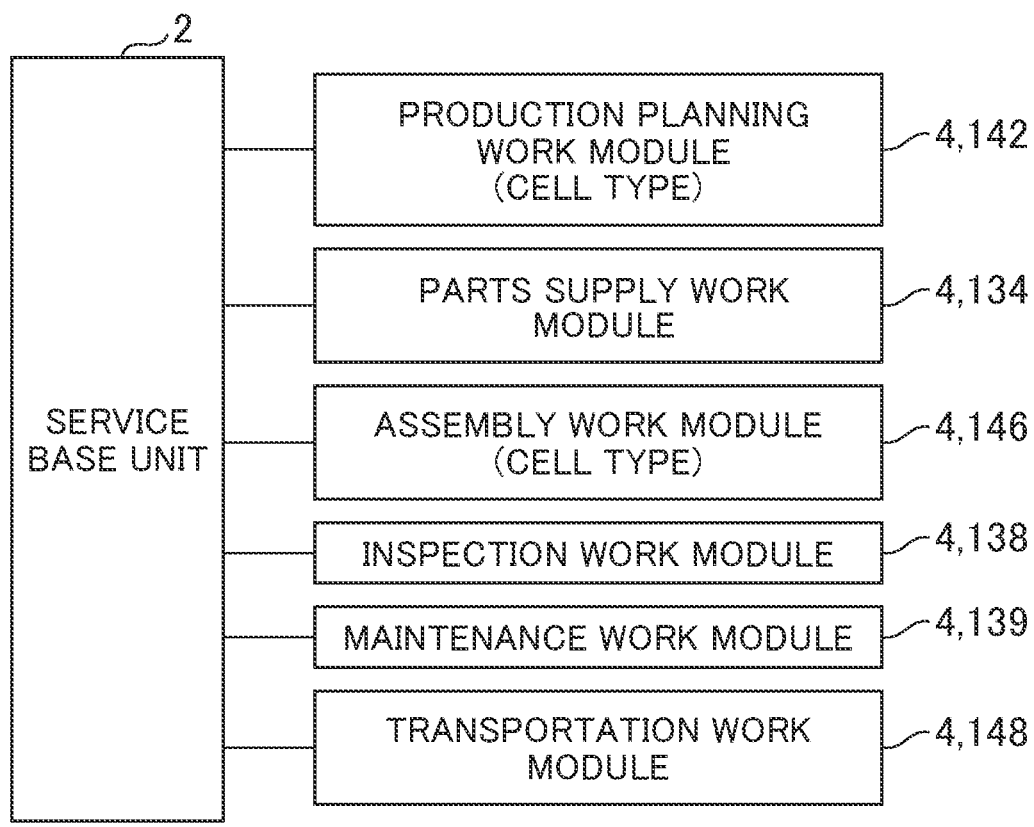
FIG. 4 is a diagram showing an example of a work module configuration added with a transportation work module.

FIG. 4 is a diagram showing an example of a work module configuration in which a transportation work module 148 is added. That is, in the configuration of FIG. 4, the work modules 4 shown in FIG. 3 are all connected to the service base unit 2. Further, the transportation work module 148 is connected to the service base unit 2. More specifically, in the development device 12, the user reads the transportation work module 148 from the module material storage 6 and connects the same to the service base unit 2. Next, the user performs a test on the service base unit 2 and each work module 4. When the test is completed, the user transfers the service base unit 2 and the work module 4 from the development device 12 to the work control device 22.

Further, combinations of a plurality of work modules 4 having a high possibility of being applied simultaneously can be registered as recipes 44 (refer to FIG. 5) in the work module material storage 6. In the above-described example, a combination of the line-type production planning work module, the parts supply work module, the line-type assembly work module, the inspection work module, and the maintenance work module can be registered for a line-type factory as one recipe 44. Similarly, a combination of the cell-type production planning work module, the parts supply work module, the cell-type assembly work module, the inspection work module, and the maintenance work module can be registered for a cell-type factory as another recipe 44.

Furthermore, each work module material 7 stored in the work module material storage 6 can be newly connected to the service base unit 2. When the work module material 7 is connected to the service base unit 2, it becomes the work module 4. For example, assume that there occurs a demand for addition of the work of "transportation work" to the work control device 22. In that case, the user reads the work module material 7 related to the transportation work from the work module material storage 6 in the development device 12 and connects the same to the service base unit 2.

Then, the corresponding work module material 7 becomes the work module 4 in the development device 12. Thereafter, when the service base unit 2 and the work module 4 are transferred from the development device 12 to the work control device 22, the work module 4 related to the transportation work can be executed in the work control device 22.

<Work Module Material Storage 6>

Figure 5:
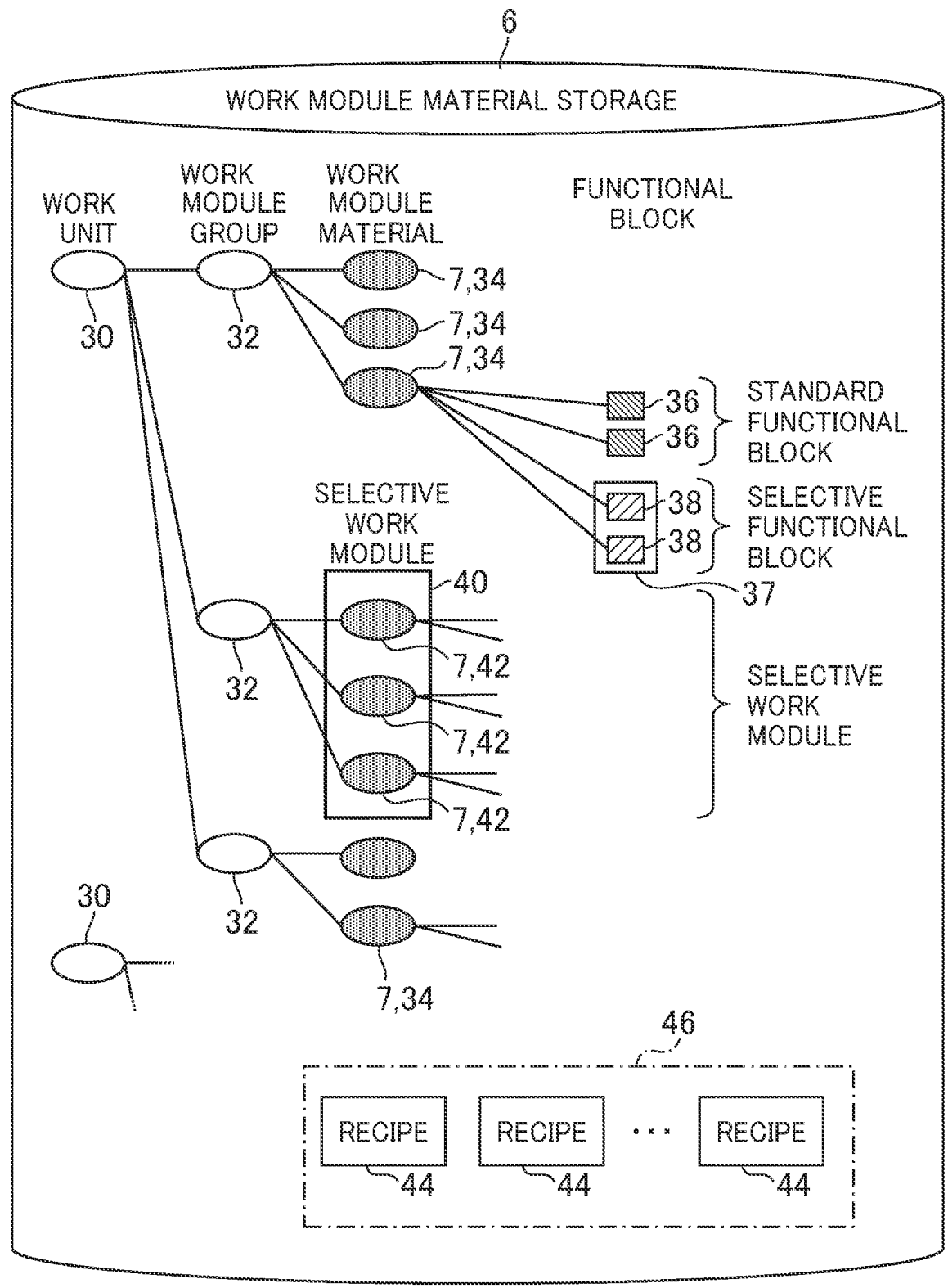
FIG. 5 is a typical diagram of a work module material storage.

FIG. 5 is a typical diagram of the work module material storage 6.

The work module material storage 6 manages the various work module materials 7 in a tree structure. In FIG. 5, a work unit 30 is a large classification of the work module materials 7, such as a "factory work", a "physical distribution work", a "sales work", etc. Further, each work module group 32 is a subdivided classification of the work unit 30.

For example, in terms of the work unit for the "factory work", a "production plan planning", "parts supply", a "setup", "manufacture", an "inspection", "transportation", a "completed product stock control", etc. become the work module group 32. Further, the work module groups 32 respectively include one or plural work module materials 7. In addition, the work module materials 7 shown in FIG. 5 are classified into standard work modules 34 or selective work modules 42.

Here, the standard work modules 34 are work module materials 7 which are singly attachable/detachable to/from the service base unit 2 independently of other work modules. Also, the selective work modules 42 are included in any work module group 40. Further, only one module of a plurality of selective work modules 42 belonging to a certain work module group 40 is selectively connectable to the service base unit 2.

The user is capable of selecting a desired work module material 7 out of the work module material storage 6 as the work module 4 to be actually applied. Further, each work module 4 (or work module material 7) includes one or plural functional blocks. The user is capable of individually validating or invalidating these functional blocks. In addition, when the functional block is validated, the functional block realizes a predetermined function in the corresponding work module 4. These functional blocks are classified into a standard functional block 36 (functional block) and a selective functional block 38 (functional block). Both may be collectively called functional blocks 36 and 38.

The standard functional block 36 is a standard functional block capable of being singly validated or invalidated independently of other functional blocks. The selective functional block 38 is included in any functional block group 37. Further, only one of a plurality of selective functional blocks 38 belonging to a certain functional block group 37 can be selectively validated.

When the presence or absence of a work module having a certain function is retrieved from the work unit 30, the user is capable of retrieving it following the tree structure of the work unit 30, the work module groups 32, and the work module materials 7. In that case, a tree view (not shown) representing the tree structure can be displayed on the display of the output device 16. Further, when the user input a retrieval key in a predetermined retrieval dialog box (not shown), the user is able to retrieve the work module according to the retrieval key. The retrieval key may be, for example, a classification of work functions, or a classification of work departments (production, materials, etc.), or a purpose classification.

In the development device 12 (refer to FIG. 1), the operation of attaching/detaching the work module 4 to/from the service base unit 2 can also be executed from a retrieval screen for the work module. Further, the user is capable of adding a new work module or, when a work module is created, adding it to the work module material storage 6. In addition, the work module material storage 6 includes a recipe collection area 46 which stores a plurality of recipes 44 therein.

<Event Distribution Record>

Figure 6:
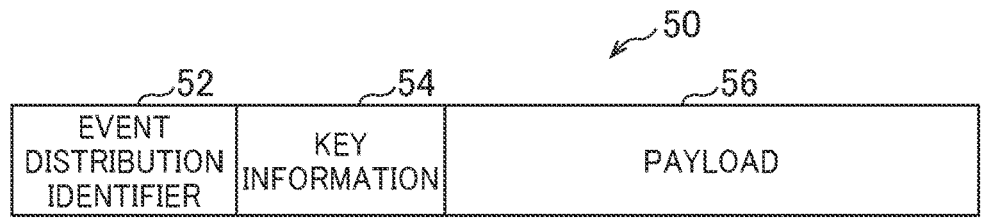
FIG. 6 is a typical diagram of an event distribution record.

FIG. 6 is a typical diagram of an event distribution record 50 (event information).

The respective work modules 4 (refer to FIG. 1) communicate with each other via the service base unit 2. Therefore, each work module 4 inputs and outputs an event distribution record 50 (hereinafter may simply be called a record 50) shown in FIG. 6 to and from the service base unit 2. In FIG. 6, the event distribution record 50 has an event distribution identifier 52 (identifier), key information 54, and a payload 56. Here, the key information 54 is information indicative of the kind (e.g., order No. process No., the amount of stocks, etc. to be described later) of the payload 56.

When a certain work module 4 outputs (transmits) the event distribution record 50 to the service base unit 2, the service base unit 2 transfers the record 50 to all work modules 4 inclusive of the work module 4 as a transmission source. Further, each work module 4 having received the event distribution record 50 therein determines, based on the event distribution identifier 52 included in the record 50, whether the record 50 relates to its own module. Then, the work module 4 ignores each record 50 unrelated to its own module and executes various processing of its own module, based on the record 50 related to its own module. Incidentally, in that case, the work modules 4 respectively determine the record 50 to "be related to its own module", and in parallel with it, the processing of each work module 4 may be executed.

Figure 7:
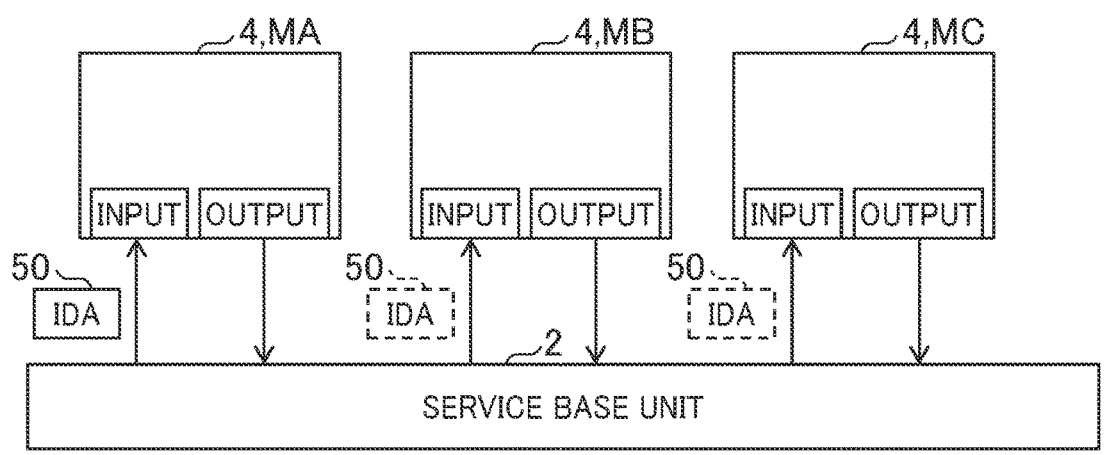
FIG. 7 is a typical diagram showing a distribution method for an event distribution record.

FIG. 7 is a typical diagram showing a distribution method of the event distribution record 50.

In the example shown in the drawing, three types of modules MA, MB, and MC are connected to the service base unit 2 as work modules 4. Then, assume that three types of identifiers IDA, IDB (not shown), and IDC (not shown) exist as event distribution identifiers 52. For example, the module MA processes an event distribution record 50 having the identifier IDA, and other records 50 may be ignored. Similarly, the module MB processes a record 50 having the identifier IDB, and other records 50 may be ignored. Likewise, the module MC processes a record 50 having the identifier IDC, and other records 50 may be ignored.

In the example shown in FIG. 7, the event distribution records 50 each having the identifier IDA are transmitted to all the modules MA, MB, and MC. As described above, in the module MA, processing corresponding to this record 50 is executed, and in each of the modules MB and MC, this record 50 is ignored. In FIG. 7, the records 50 to be ignored are indicated by broken lines. Each work module 4 executes the processing corresponding to the event distribution record 50 asynchronously. That is, the work modules 4 process the plural records 50 received from the service base unit 2 in the order of their reception.

Now, when there no exists the work module 4 which processes the event distribution record 50, the corresponding record 50 is ignored. In the above-described example, for example, assume that since the module MB of the modules MA, MB, and MC becomes unnecessary, the module MB is deleted. Then, even if the modules MA and MC transmit the record 50 having the identifier IDB via the service base unit 2, the corresponding record 50 is ignored. That is, when the module MB is deleted, a phenomenon that "the processing of the unneeded module MB is not executed" occurs, but the influence other that it hardly occurs. Thus, in the present embodiment, each work module 4 is independently attachable/detachable to/from the service base unit 2 or can be added thereto.

<Configuration of Work Module 4>

Figure 8:
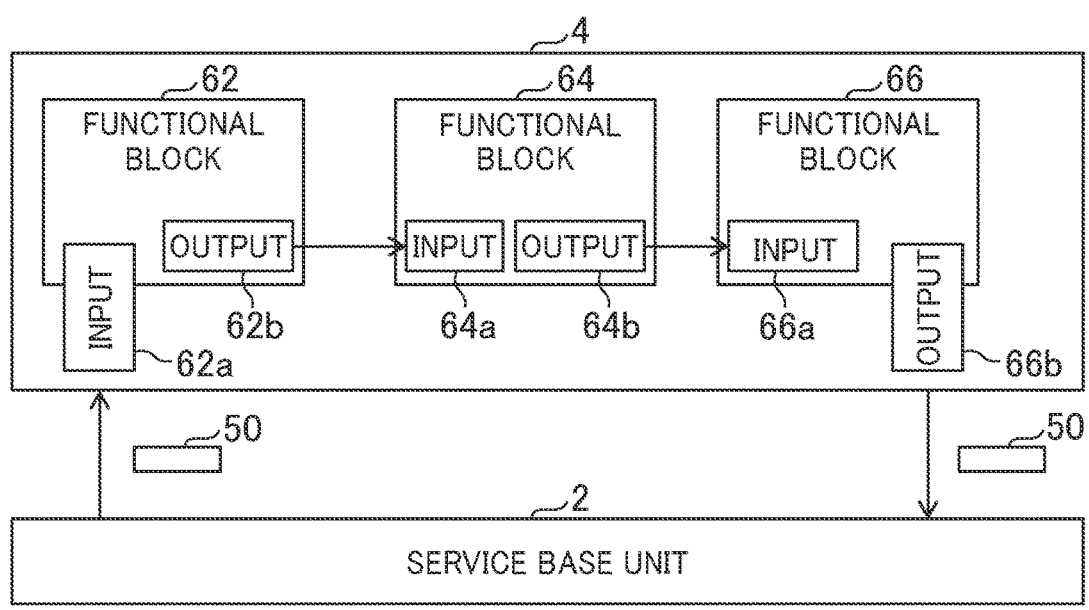
FIG. 8 is a typical block diagram of a work module.

FIG. 8 is a typical block diagram of the work module 4.

In FIG. 8, the work module 4 has three functional blocks 62, 64, and 66. Incidentally, these functional blocks are the standard functional blocks 36 or selective functional blocks 38 shown in FIG. 5. The functional blocks 62, 64, and 66 respectively include input functions 62a, 64a, and 66a and output functions 62b, 64b, and 66b. Further, in the example shown in the figure, the functional blocks 62, 64, and 66 are connected in series.

Further, in the example shown in the drawing, the input function 62a of the functional block 62 also serves as an input function of the work module 4. Further, the output function 66b of the functional block 66 also serves as an output function of the work module 4. The output function 62b of the functional block 62 is connected to the input function 64a of the functional block 64, and the output function 64b of the functional block 64 is connected to the input function 66a of the functional block 66.

When the work module 4 receives the event distribution record 50 therein, the record 50 is supplied to the functional block 62. Then, a result of processing by the functional block 62 is supplied to the functional block 64, and a result of processing by the functional block 64 is supplied to the functional block 66. The functional block 66 converts its processing result to an event distribution record 50 for output and transmits it to the service base unit 2 via the output function 66b. Incidentally, in the example shown in FIG. 8, the functional blocks 62, 64, and 66 in the work module 4 are connected in series, but a method of connecting each functional block in the work module 4 is optional and not limited to the series connection.

<Specific Example of Operation of Work Module 4>

FIG. 9 is a diagram showing an example of a control sequence in the work control device 22. In FIG. 9, the work control device 22 includes a cell type production work module 72 (production work module), a work result registration module 74 (work result registration module), a DB control module 76, and a stock control module 78. Any of these modules 72 to 78 is the above-described work module 4. Further, any of records 102 to 122 in the figure is the above-descried event distribution record 50.

Here, the cell type production work module 72 is a work module which manages a work of manufacturing an unillustrated product. Also, the DB control module 76 is a work module which inputs and outputs data to and from a database 77 on the basis of a command from another work module. The work result registration module 74 is a work module which registers a work result in the cell type production work module 72 in the database 77 via the DB control module 76. Further, the stock control module 78 is a work module which adjusts the number of product stocks stored in the database 77 through the DB control module 76.

Incidentally, in the following description, the term "transmitting an event distribution record from a certain (transmission source) work module 4 to another (transmission destination) work module 4" means:

(1) the transmission source work module 4 transmits an event distribution record having an event distribution identifier 52 corresponding to the transmission destination work module 4 to the service base unit 2, (2) the service base unit 2 transfers the record to all the work modules 4 inclusive of the transmission source work module 4, (3) each work module 4 having received the record therein determines based on the event distribution identifier 52 in the record whether or not it relates to its own module, and (4) the transmission destination work module executes processing corresponding to the record by determining "that it relates to its own module".

In FIG. 9, when the transmission destination work module determines that "the record does not relate to its own module", the record is ignored in the transmission destination work module. In each of Steps S2 to S10 of FIG. 9, the so-ignored record is indicated by a broken line arrow (no sign).

In Step S2 of FIG. 9, assume that a record 102 (event information) is transmitted from another unillustrated work module to the cell type production work module 72 via the service base unit 2 (refer to FIG. 1). A payload 56 (refer to FIG. 6) of the record 102 includes an order No. uniquely given to an order, and a process No. uniquely given to a process.

Next, in Step S4, the cell type production work module 72 transmits a record 104 (first event information) to the work result registration module 74 on the basis of the record 102. A payload 56 of the record 104 includes information showing an intention to start a product production work, and a time stamp TS1 indicative of the current time.

Next, in Step S6, the work result registration module 74 transmits a record 106 to the DB control module 76 on the basis of the record 104. Here, a payload 56 of the record 106 includes the information showing the intention to start the product production work, and the time stamp TS1. Next, in Step S8, the DB control module 76 registers the intention to start the product production work, and the time related to the time stamp TS1 in the database 77 on the basis of the record 106.

Thereafter, assume that the product production work is completed in the cell type production work module 72. Then, in Step S10, the cell type production work module 72 transmits a record 110 (second event information) to the stock control module 78. Here, a payload 56 of the record 110 includes information about an intention to increase the number of stocks by the number of products to be manufactured, and a time stamp TS2 indicative of the current time.

Described more specifically, the cell type production work module 72 supplies a record 110 having an event distribution identifier 52 related to the stock control module 78 to the service base unit 2. Then, the service base unit 2 transmits the record 110 to all work modules 4. The stock control module 78 determines that when the record 110 having the event distribution identifier 52 related to its own module is supplied, "the record relates to its own module", and starts corresponding processing. On the other hand, the work result registration module 74 and the DB control module 76 determines that "there is no relation to its own module" in terms of the record 110, and ignores the record 110.

The stock control module 78 adds the current number of stocks and the number of products to be manufactured notified by the record 110 to thereby calculate the new number of stocks. Next, in Step S12, the stock control module 78 transmits a record 112 to the DB control module 76 on the basis of the record 110. Here, a payload 56 of the record 112 includes the new number of stocks to be registered in the database 77. Next, in Step S14, the DB control module 76 registers the new number of stocks in the database 77 on the basis of the record 112.

Further, in the cell type production work module 72, Step S20 is executed following Step S10. In Step S20, the cell type production work module 72 outputs a record 120 (third event information) to the work result registration module 74. A payload 56 of the record 120 includes information showing an intention of completion of a product production work, and a time stamp TS2 indicative of the above-described production completion time.

Next, in Step S22, the work result registration module 74 transmits a record 122 to the DB control module 76 on the basis of the record 120. Here, a payload 56 of the record 122 includes information showing the intention of completion of the product production work, and the time stamp TS2 indicative of the above-described production completion time.

Next, in Step S24, the DB control module 76 registers the intention of completion of the product production work and the time related to the time stamp TS2 in the database 77 on the basis of the record 122.

Advantageous Effects of Embodiment

As described above, according to the present embodiment, the service base unit (2) has the function of receiving the event information (50) from any module (4) and the function of transferring the event information (50) to other module (4). The other module (4) to which the event information (50) is transferred determines based on the identifier (52) included in the transferred event information (50) whether it performs the in-module processing within its own module. Thus, since the addition, deletion, and replacement of the modules (4), etc. become easy, flexibility can be enhanced, and quick system development is made possible.

Here, the plural modules (4) are provided for each work, and the in-module processing is processing corresponding to the work. Thus, a corresponding relation between a change of the work and a change of each module (4) becomes clear, and quicker system development is made possible.

Also, the work system (1) further includes the module material storage (6) storing therein the plural module materials (7) which can be any candidate of the plural modules (4). The work system (1) is capable of selecting, based on the operation of the user, a desired module material (7) as the module (4) and deleting a desired module (4).

Further, any of the plural module materials (7) can be replaced with any of the plural modules (4), and any of the plural module materials (7) can be added as a new module (4). Thus, since the addition, deletion, and replacement of the modules (4), etc. are further facilitated, quicker system development is made possible.

In addition, the module material storage (6) includes the recipe collection area (46) storing therein the plural recipes (44) with the combination of the plural modules (4) as the recipe (44). Thus, when one recipe (44) is designated, the plural modules (4) can be designated, and quicker system development is made possible.

Furthermore, one module (4) or module material (7) has the plural functional blocks (36, 38) each of which performs a predetermined function, and the user is capable of, for each functional block (36, 38), selecting its validation or invalidation. Consequently, various functional variations can be realized for one module (4).

The module material storage (6) stores therein the plural work module groups (32) in which the plural module materials (7) are taken as elements. Thus, the module materials (7) can be managed by a hierarchical structure, and the retrieval of the module materials (7) and the like become easy.

In addition, according to the configuration in which the plural modules (4) respectively include the production work module (72) which manages the work of manufacturing one or plural predetermined products, the work result registration module (74) which causes the work result in the production work module (72) to be registered in the database (77), and the stock control module (78) which causes the number of product stocks stored in the database (77) to be adjusted, the production work, the work result registration, and the stock control can be allowed to cooperate.

Furthermore, the production work module (72) has the function of transmitting the first event information (104) indicative of the intention to start the manufacture of the product to the work result registration module (74), and the function of transmitting the second event information (110) of notifying the number of products to be manufactured, to the stock control module (78) and transmitting the third event information (120) indicating the intention of completion of the manufacture of the product to the work result registration module (74), whereby the work result registration and the stock control can be appropriately executed according to the progress of the production work.

Modifications

The present invention is not limited to the above-described embodiment, but can be modified in various ways. The above-described embodiment has been illustrated to explain the present invention in an easy-to-understand manner, but is not necessarily limited to one having all configurations described. Also, another configuration may be added to the configuration of the above-described embodiment, and a part of the configuration can also be replaced with other configurations. Further, control lines and information lines shown in the drawing respectively indicate those considered to be necessary for description, but do not necessarily show all control and information lines necessary for the product. Almost all the configurations may be considered to have been connected to each other in practice. Modifications possible with respect to the above embodiment are as follows for example:

(1) In the above-described embodiment, when the certain work module 4 outputs the event distribution record 50 to the service base unit 2, the service base unit 2 has transferred the record 50 to all the work modules 4 inclusive of the transmission source work module 4. However, the service base unit 2 may transmit the record 50 to other work modules 4 excluding the transmission source work module 4.

(2) Since the hardware of the development system 10 and the work control system 20 in the above embodiment can be realized by a general computer, the program or the like to execute the above-mentioned various processing may be stored in a storage medium or may be distributed via a transmission path.

(3) Although the above-described various processing have been described as the software-like processing using the program in the above embodiment, a part or all thereof may be replaced with hardware-like processing using an ASIC (Application Specific Integrated Circuit; Specific-purpose IC) or an FPGA (Field Programmable Gate Array) or the like.

What is claimed is:

1. A work system comprising:
a plurality of modules each having software for work which performs predetermined in-module processing;
a service base unit which inputs and outputs event information to and from the modules; and
a module material storage which stores a plurality of module materials capable of being any candidate of the modules;
wherein the event information includes an identifier and a payload,
wherein the service base unit has a function of receiving the event information from any of the modules, and a function of transferring the event information to the other module,
wherein the other module to which the event information is transferred determines based on the identifier included in the transferred event information whether the in-module processing is performed within its own module,
wherein the desired work module material is capable of being selected as the module, based on the operation of a user, and the desired module is capable of deletion,
wherein the modules include:
a production work module which manages a work of manufacturing one or plural predetermined products,
a work result registration module which causes a work result in the production work module to be registered in a database, and
a stock control module which causes the number of product stocks stored in the database to be adjusted.

2. The work system according to claim 1, wherein the modules are provided for each work, and the in-module processing is processing corresponding to the work.

3. The work system according to claim 1, wherein any of the module materials is capable of being replaced with any of the modules.

4. The work system according to claim 3, wherein the module material storage includes a recipe collection area which sets a combination of the modules as a recipe and stores a plurality of the recipes therein.

5. The work system according to claim 3, wherein any of the module materials is capable of being added as the new module.

6. The work system according to claim 3, wherein the one module or module material includes a plurality of functional blocks each executing a predetermined function, and the user is capable of selecting validation or invalidation for each functional block.

7. The work system according to claim 3, wherein the module material storage stores therein a plurality of work module groups with the module materials as elements.

8. The work system according to claim 1, wherein the production work module includes:
a function of transmitting first event information indicating an intention to start the production of the product to the work result registration module, and
a function of transmitting second event information of notifying the number of the products to be manufactured to the stock control module and transmitting third event information indicating an intention of the completion of manufacture of the product to the work result registration module.

9. A non-transitory computer readable medium storing a program for causing a computer to function as a plurality of modules having software for work each performing predetermined in-module processing, and a service base unit inputting and outputting event information to and from the modules, and a module material storage storing a plurality of module materials capable of being any candidate of the modules,
wherein the event information includes an identifier and a payload,
wherein the service base unit has a function of receiving the event information from any of the modules, and a function of transferring the event information to the other module,
wherein the other module to which the event information is transferred determines based on the identifier included in the transferred event information whether the in-module processing is performed within its own module, and
wherein the desired work module material is capable of being selected as the module, based on the operation of a user, and the desired module is capable of deletion,
wherein the modules include:
a production work module which manages a work of manufacturing one or plural predetermined products,
a work result registration module which causes a work result in the production work module to be registered in a database, and
a stock control module which causes the number of product stocks stored in the database to be adjusted.

* * * * *